2,891,021
ALKYL PHENOL FORMALDEHYDE RESIN ESTERS

David Aelony, Minneapolis, Minn., assignor to General Mills, Inc., a corporation of Delaware No Drawing. Application April 26, 1954
Serial No. 425,749

8 Claims. (Cl. 260—19)

The present invention relates to esters of alkyl substituted phenol-formaldehyde resins. The present application is a continuation-in-part of my co-pending applications Serial No. 300,753 filed July 24, 1952 and Serial No. 281,038 filed April 7, 1952, both abandoned, the latter application being a continuation-in-part of my application Serial No. 142,709 filed February 6, 1950, now Patent No. 2,649,422.

The esters of the present invention are derived from alkyl substituted phenol-formaldehyde resins and higher unsaturated fatty acids such as those derived from drying oils or semi-drying oils. The esters are liquid drying oils which dry rapidly to yield hard, tough resilient films. The films are resistant to hot and cold water and display phenomental resistance to aqueous alkali.

It is, therefore, an object of the present invention to provide novel unsaturated higher fatty acids esters of alkyl substituted phenol-formaldehyde resins of a particular type. It is another object of the present invention to provide novel esters of the above type which are capable of drying to hard, tough, resilient film displaying good resistance to hot and cold water and aqueous alkali.

The resins employed in the present invention are derived from formaldehyde and an alkyl substituted phenol in which the alkyl substituent contains from 1–8 carbon atoms. The phenol may contain a single alkyl substituent as in the case of cresol or may contain a plurality of substituents as in the case of xylenol. The phenol should have two reactive positions available such as the two ortho positions or an ortho and the para position. Typical phenols which are suitable for the present purposes include cresol, xylenol, ethyl phenol, isopropyl phenol, tertiary butyl phenol, tertiary amyl phenol, hexyl, heptyl and octyl phenols. The substituents may be either straight or branched chain.

The phenolic resins contain on the average from 4 to about 15 phenolic groups in the resin molecule and are substantially free from volatile materials and particularly from residual phenol and lower molecular weight condensation products such as the condensation products containing two phenolic nuclei.

The reaction of the phenol and the formaldehyde may be carried out either at atmospheric pressure or under superatmospheric pressure. The time required for the condensation varies with the temperature and with the amount and type of catalyst. As will be seen from the examples, resins made by condensation for from ½ to 7 hours at a 160° C. are suitable for the present invention. Where a strong catalyst such as HCl is employed, a suitable degree of condensation may be obtained in a shorter period of time and at a lower temperature.

After the resinification reaction, the resin is subjected to a treatment to eliminate low molecular weight condensation products and residual phenol. This may be accomplished by subjecting the resin to a stripping process which may conveniently be carried out at temperatures of at least 250° C. at an absolute pressure of mercury usually in the range of 1–5 mm. Preferably, however, under these conditions of vacuum the stripping is carried out until the temperature of 270–310° C. is attained. At the higher temperatures for stripping somewhat higher pressures may be tolerated.

In place of subjecting the phenolic resin to a stripping process, the residual phenol and the low molecular weight condensation products may be caused to combine with the rest of the polymer by subjecting the reaction mixture to a further heat treatment or bodying operation at temperatures between 250 and 300° C. In this process the resin undergoes further condensation and the residual phenol and the low molecular weight condensation products substantially completely react with the rest of the resin.

The resins thus obtained are hard brittle resins of light color. They are insoluble in fatty oils and fatty acids. The resins most useful in the present invention have a viscosity ranging from approximately 5 to approximately 35 centistokes in a 30% solution by weight in dimethyl formamide. A preferred range of viscosities is 8 to 20 centistokes. This viscosity is determined as follows: A filtered 30% solution by weight of the resin in dimethyl formamide is tested in the Ostwald-Fenske S300 viscosimeter at 30° C. using 10 cc. of solution. The time thus obtained is compared with the time and viscosity of a National Bureau of Standards standard sample oil K–5 to determine the viscosity of the 30% solution of the resins in accordance with the formula:

$$\text{Viscosity in centistokes} = \frac{t_x}{d_s t_s} \eta_s \cdot 100$$

where $t_x$ = time of efflux for polymer solution
$d_s$ = density of standard
$t_s$ = time of efflux of standard
$\eta_s$ = absolute viscosity of standard, in poises The time of efflux varied from 21 to 74 seconds with the viscosimeter employed.

The resins above described are esterified with unsaturated higher fatty acids containing from 8–22 carbon atoms. These fatty acids may be single isolated fatty acids, or mixtures of fatty acids derived from a drying or semi-drying oil, or any selected fraction of the mixed acids of a drying oil or semi-drying oil. Typical drying oil and semi-drying oil acids include those from soybean oil, linseed oil, tung oil, perilla oil, oiticica oil, sunflower oil, safflower oil, menhaden oil, and the like. The acids employed for esterification should have an iodine number of at least 100 and preferably at least 110.

The esterification may be carried out by simply heating the resins with the fatty acids at temperatures from about 200–275° C. Esterification catalysts in general may be employed, but it is preferred to employ triphenyl phosphite as the esterification catalyst. The time required for esterification varies widely, depending upon the conditions, but in general, from about 2 to about 10 hours is sufficient time to effect a desired degree of esterification. In order to speed up the esterification reaction it is preferred to employ an excess of fatty acids over the theoretical quantity of fatty acids necessary for complete esterification. The excess fatty acids may then be stripped off by vaporization after the esterification is substantially complete. The employment of an excess of fatty acids not only speeds up the reaction but also prevents undue polymerization of the fatty acids during esterification by reducing the time period during which the fatty acids are subjected to the elevated temperature. When less than complete esterification is desired, substantially the theoretical quantity of acids for the desired degree of esterification may be used; the excess hydroxyl groups speed up the reaction.

The resins of the present invention are esterified from 50–100% by means of the unsaturated higher fatty acids. The particular range of esterification employed depends upon the application to which the esters are to be put. For certain metal primers a degree of esterification within the range of 50–70% has been found to be preferred. For other applications higher degrees of esterification on up to complete esterification are preferred.

The esters preferably have relatively low acid numbers. Usually an acid number as low as 30 is desired and usually an acid number below 20 or even below 10 is preferred. This low acid number may be attained in different ways, thus where a relatively low degree of esterification is to be obtained, the esterification may be carried out with about 50–80% of the quantity of free fatty acids which would be required for complete esterification. Under these circumstances practically all of the free fatty acid may react with the resin and produce an ester of about 50–80% esterification and at the same time the ester has a very low acid number. In other instances, especially where the higher degrees of esterification are desired, it is preferred to employ an excess of the acid and then after the desired degree of esterification has been obtained, the excess acid may be removed by stripping. This stripping may involve subjecting the ester to a vacuum of, for example, about 1–5 mm. of mercury absolute pressure at a temperature ranging from 260–275° C. This results in the removal of virtually all unesterified fatty acids and also removes any other volatile material which may be present. It is apparent that this method of stripping may likewise be applied to lower degrees of esterified resins if desired.

In addition to the straight vacuum stripping of the resin and resin esters, other ways of removing the volatile materials may be employed. These methods include steam distillation of the volatile material, solvent extraction as for example with methanol, and in general any known method of removing low molecular weight volatile material from polymeric material.

The products of the present invention may be simple fatty acid esters of the phenolic resins or may be mixed fatty and rosin acid esters of the resins. It has been discovered that when a mixture of rosin acids and the fatty acids is used for esterification the esters obtained are superior in drying rates and the films obtained are superior in hardness and in alkali resistance. Of the total esterified acids from 10–40% may be rosin acids. The preferred range is from 15–30% of rosin acids. Any source of rosin acids may be employed. However, for the sake of economy it is preferred to employ a commercially available product which is the rosin acid fraction resulting from the fractional distillation of the acids of tall oil. These rosin acid fractions may contain from 60–80% of rosin acids with the balance being predominantly higher fatty acids, mostly unsaturated. The rosin acid fraction of tall oil also contains a minor quantity of unsaponifiable materials. The fatty acid content of the rosin acid fraction should be taken into account in bringing the rosin acid content of the mixed acid into the range referred to above. In calculating the polymerizability index as hereinafter described the rosin acids need not be taken into consideration.

The products which are suitable for the present invention are those which have a polymerizability index ranging from 140 to 1000. The polymerizability index is an indication of the molecular weight of the resin employed, as well as the degree of polymerizability of the fatty acids employed for esterification. The polymerizability index is defined as the mathematical product of the viscosity in centistokes at 30° C. of a 30% by weight solution of the resin in dimethyl formamide as previously described, and the viscosity in centistokes obtained on a bodied sample of the fatty acids to be employed for esterification.

The method of determining the viscosity of the bodied fatty acids is as follows: 500 grams of the fatty acids to be employed for esterification are heated to a temperature of 260° C. under nitrogen and are held at that temperature for 7 hours. The bodied fatty acids are then cooled to 40° C. before being contacted with the atmosphere. The viscosity is then determined at 40° C. in the Ostwald-Fenske viscosimeter using 10 cc. of the acids. The viscosity of these acids is determined in centistokes by comparison with a standard in the manner previously described. In general, the viscosities of the bodied acids range from 20 to 100 centistokes.

When the mathematical product of the resin viscosity and the bodied acid viscosity (the polymerizability index) falls within the range of 140 to 1000, the resin esters are found to possess the desirable properties previously described. When this polymerizability index substantially exceeds 1000, the resin ester is likely to be a gel or is likely to gel readily during application or use. Frequently when it is attempted to prepare a product having a polymerizability index in excess of 1000 gelation occurs during the esterification reaction. When the polymerizability index is below 140, the product is found to be of too low molecular weight and is decidedly inferior in properties, particularly in the alkali stability. A preferred range of polymerizability indices is from 280 to 600.

In general, the products of the present invention are characterized by exceptional stability toward aqueous alkali. This has been determined by exposing dried films of the resin esters to 5% aqueous sodium hydroxide at room temperature for extended periods of time. In general, the products of the present invention are stable to 5% aqueous sodium hydroxide for at least 4 hours. Some of the products have not failed in 5% aqueous sodium hydroxide even after exposure to this solution for 60 or more days. The alkali stability is determined by exposing the films deposited on test tubes to the alkali and at intervals removing the coated test tube from the aqueous alkaline solution and rubbing it between the fingers to determine whether or not the film has softened enough to fail. For purposes of comparison it may be stated that high quality alkyd resins fail in 5% aqueous alkali in as short a time period as 20 to 30 minutes.

It should be pointed out that in the past, attempts have been made to esterify phenolic resins. Typical examples of these prior attempts are to be found in Cherry Patent 2,091,965 and Sorenson 2,544,365. In these prior attempts however, no attempt has been made to adequately characterize the resins which are employed, nor has any attempt been made to eliminate low molecular weight materials. Moreover, these prior attempts have relied on acetic anhydride to assist in the esterification with the unsaturated higher fatty acids. This necessarily resulted in some acetylation of the resin. The introduction of the acetyl groups into the resin impairs the water and alkali resistance of the product. In the present invention reliance is not placed on acetic anhydride and accordingly acetyl groups are not present in the present product.

Example 1

The following materials were charged into an autoclave:

| | Grams |
|---|---|
| Para-tertiary-butylphenol | 1500 |
| Formalin | 813 |
| Oxalic acid | 10 |

The autoclave was closed and the reaction mixture heated to 160° C. for 5 hours. The autoclave was cooled and the resin was removed. It weighed 2284 g. The resin was stripped by subjecting it to water pump vacuum and heating it up to 270° C. to yield a resin having a melting point of 205–225° C. (evacuated tube). The viscosity of a 30% solution of this resin in dimethyl formamide was 10.82 centistokes.

162 grams of the above resin, 350 g. of the $C_{18}$ acids of soybean oil (in the bodied form these acids had a viscosity of 24.65 centistokes), 3 g. of triphenyl phosphite and 50 cc. of xylene were refluxed and agitated under a Stark and Dean tube. The temperature was maintained at 260° C. for 4 hours at which time the theoretical quantity of water required for 100% of esterification had been obtained. The ester was diluted with 100 cc. of xylene, mixed with a filter aid, and was then filtered. The filtrate was evaporated and stripped up to a temperature of 275° C. at 100μ. A 60% solution by weight in mineral spirits was prepared, the solution containing 0.3% Pb and 0.06% Co as naphthenates. In this and the following examples the solution was applied to plates and tubes and the films were allowed to dry. The dried films were tested, the results being indicated in the table given hereinafter.

Example 2

162 grams of the resin of Example 1, 350 g. of linseed oil fatty acids (bodied viscosity 43.29 centistokes), 3 g. of triphenyl phosphite, and 50 cc. of xylene were refluxed and agitated under a Stark and Dean tube at 260° C. for 3 hours 40 minutes, at which time approximately the theoretical quantity of water required for complete esterification was obtained. The product was diluted with xylene, mixed with filter aid, and filtered. The filtrate was evaporated and stripped to a temperature of 275° C. at 5μ. A 60% solution in mineral spirits containing the driers previously described was prepared.

Example 3

162 grams of the resin of Example 1, 350 g. dehydrated castor oil fatty acids (bodied viscosity 70.33 centistokes), 3 g. triphenyl phosphite, and 50 cc. of xylene were refluxed and agitated under a Stark and Dean tube at 260° C. for 2¼ hours, at which time 17.7 cc. of a theoretical quantity of 18 cc. of water required for complete esterification were obtained. The ester was diluted with xylene, mixed with filter aid, and filtered. The filtrate was evaporated and stripped to 250° C. at 25μ. The 60% solution in mineral spirits was prepared containing driers as previously described.

Example 4

The following materials were charged into an autoclave:

| | Grams |
|---|---|
| Para-tertiary-butylphenol | 1500 |
| Formalin | 813 |
| Oxalic acid | 10 |

The autoclave was closed and was heated to a temperature of 160° C. and maintained at that temperature for 3 hours. The autoclave was then cooled to 105° C., at which time the autoclave was opened and the resin transferred to a 5-liter flask. The resin was stripped by evacuating the flask to 10 mm. and heating the resin to a temperature of 275° C. The resin had a melting point of 174–188° C. and had a viscosity in a 30% solution in dimethyl formamide of 9.58 centistokes.

162 grams of the above resin, 280 g. of the soy acids of Example 1, 3 g. triphenyl phosphite, and 50 cc. of xylene were refluxed and agitated under a Stark and Dean tube at 260° C. After 6 hours, 17.25 cc. out of a theoretical 18 cc. required for complete esterification were obtained. The product was stripped by heating to 270° C. at 40μ. A 70% solution in mineral spirits was prepared and filtered. Drier in the form of 0.1% Co as naphthenate on the solids basis was then added.

Example 5

The following materials were charged into an autoclave:

| | Grams |
|---|---|
| Para-tertiary-butylphenol | 1500 |
| Formalin | 813 |
| Oxalic acid | 10 |

The autoclave was closed and was then heated to 160° C. for 7 hours. The autoclave was cooled and the resin removed. The resin was stripped to 270° C. at water pump vacuum to yield a resin which melted at 205–225° C. (evacuated tube). The resin had a viscosity of 10.75 centistokes in a 30% solution by weight in dimethyl formamide.

162 grams of the above resin, 350 g. of the dehydrated castor oil fatty acids of Example 3, 3 g. triphenyl phosphite, and 50 cc. of xylene were refluxed and agitated under a Stark and Dean tube at 260° C. for 2½ hours. At that time 17.5 cc. of a theoretical 18 cc. required for complete esterification were obtained. The product was diluted with xylene, mixed with filter aid, and filtered. The filtrate was evaporated and stripped to 255° C. at 50μ. A 60% solution of the stripped ester in mineral spirits was prepared containing 0.1% cobalt as the naphthenate on the solid basis.

Example 6

162 grams of the resin of Example 5, 350 g. of the linseed oil fatty acids of Example 2, 3 g. triphenyl phosphite, and 50 cc. of xylene were refluxed and agitated under a Stark and Dean tube at 260° C. for 4 hours. At this time the theoretical quantity of water required for complete esterification was obtained. The product was diluted with 100 cc. of xylene, mixed with filter aid, and filtered. The filtrate was evaporated and stripped to 275° C. at 25μ. A 60% solution in mineral spirits was prepared containing 0.3% Pb and 0.06% Co as naphthenates.

Example 7

The following materials were charged into an autoclave:

| | Grams |
|---|---|
| Para-tertiary-butylphenol | 1200 |
| Formaldehyde | 650 |
| Oxalic acid | 8 |

The autoclave was closed and the reaction mixture heated up to about 160° C. for one-half hour. The autoclave was then cooled and opened and the resin removed. It had a heavy taffy consistency and was stripped by heating to 270° C. under water pump vacuum to yield 1060 g. of resin. The resin had a capillary melting point of 133–139° C., and a hydroxyl number of 390. 887 g. of the resin was further stripped by heating to 310° C. at 3 mm. The viscosity of a 30% solution in dimethyl formamide was 5.98 centistokes.

182 grams of the stripped resin (stripped to 310° C.), 350 g. of the soybean acids of Example 1, 4 g. triphenyl phosphite, and 50 cc. of xylene were refluxed and agitated under a Stark and Dean tube at 260° C. for 6 hours. 19.6 cc. of a theoretical 20.2 cc. of water required for complete esterification was obtained. The product was evaporated and then stripped to 260° C. at 30μ. A 60% solution of the stripped material was prepared in mineral spirits and 0.3% Pb and 0.06% Co were added as naphthenates. The resultant solution was applied to tubes and plates with the following results: The films dried to no transfer in 3 hours; dried through in 3½ hours; hardness in 24 hours, 14; o.k. in 2 hours of boiling water; failed in 6 hours in 5% NaOH on rubbing; slight blush in cold water in 3 days; hardness in 7 days, 18; the blush recovered; acid number 5.1; hydroxyl number 26.1.

Example 8

162 grams of the resin of Example 7, 350 g. of the dehydrated castor oil fatty acids of Example 3, 3 g. of triphenyl phosphite, and 50 cc. of xylene were refluxed and agitated under a Stark and Dean tube at 260° C. The theoretical quantity of water required for complete esterification was obtained in 3 hrs. The product was evaporated and stripped to 260° C. at 50μ. A 60% solution in mineral spirits containing 0.3% Pb and 0.06% Co as naphthenates was prepared. The solution was applied to tubes and plates which dried to no transfer in 90 minutes and dried through in 2½ hours; hardness in 24 hours, 24; acid number 8.4; hydroxyl number 12.3; o.k. in boiling water after 2 hours immersion; failed in 5% NaOH in 2 days; hardness in 8 days, 28; o.k. in cold water in 4 days.

*Example 9*

The following materials were charged into a flask;

Para-tertiary-butylphenol _____ g __ 600
Formalin _____ g __ 486
Concentrated hydrochloric acid _____ cc __ 1

Refluxing was carried on for 1 hour. The reaction was exothermic at 95° C. After one hour the reaction mixture was evaporated until a temperature of 220° C. was reached. The temperature of 220° C. was maintained for another 30 minutes, at which time the residue had a melting point of 112.5–117.5° C., a hydroxyl number of 430, and a molecular weight of 600.

An additional batch of this resin was prepared in which an additional 1 cc. of hydrochloric acid was added after the first one-half hour of reaction. Otherwise the reaction was carried on the same to yield a resin having a melting point of 101–103.5° C., a hydroxyl number of 435.9, and a molecular weight of 581. These two batches of resin were then mixed and were stripped, first under 10 mm. vacuum, then by heating to 310° C. at 2.8 mm. The viscosity of a 30% solution in dimethyl formamide was 7.17 centistokes.

162 grams of the above stripped mixture of resin, 350 g. of the linseed oil fatty acids of Example 2, 4 g. triphenyl phosphite, and 50 cc. of xylene were refluxed and agitated under a Stark and Dean tube at 260° C. for 5 hours, at which time the theoretical quantity of water required for complete esterification was recovered. The product was evaporated and then stripped to 260° C. at 70μ. A 50% solution of the stripped material in xylene was prepared and cooled. Driers were added as in the preceding example. The solution was immediately applied to tubes and plates, which dried to no transfer in 15 minutes, and dried through in 1 hour. Films were tack free to foil in 6 hours; hardness in 24 hours, 20. The films became etched in boiling water in 2 hours, but recovered. The films blushed very slightly in cold water in 3 days, but recovered completely. They failed after 10 days immersion in 5% sodium hydroxide solution. Hardness in 7 days, 34.

*Example 10*

1200 grams of para-tertiary-butylphenol, 650 g. of formalin, and 11.2 g. of oxalic acid hydrate were introduced into a stainless steel autoclave. The temperature was maintained in the approximate range of 150–165° C. for 3 hours. The autoclave was cooled and the resin removed. 1765 grams of the crude resin was stripped to a temperature of 270° C. at 9 mm. The residue weighed 1155 g. The viscosity of a 30% solution in dimethyl formamide was 8.83 centistokes.

162 grams of the above resin, 350 g. of mixed soybean oil fatty acids, 4 g. triphenyl phosphite, and 50 cc. of xylene were refluxed and agitated under a Stark and Dean tube. The temperature was maintained at 260° C. for 4 hours, after which the theoretical quantity of water required for complete esterification had been recovered. The product was stripped to a temperature of 260° C. at 40μ. A 60% solution in mineral spirits was prepared, the solution containing 0.3% Pb and 0.06% Co as naphthenates.

*Example 11*

162 grams of the resin of Example 10, 350 g. of linseed oil acids, 4 g. triphenyl phosphite and 50 cc. of xylene were refluxed and agitated under a Stark and Dean tube. The temperature was maintained at 260° C. for 5 hours, after which the theoretical quantity of water required for complete esterification was recovered. The product was stripped to 260° C. at 50μ. A 60% solution in mineral spirits was prepared containing .3% Pb and 0.06% Co as naphthenates.

*Example 12*

162 grams of the resin of Example 10, 350 g. of dehydrated castor oil fatty acids, 4 g. triphenyl phosphite, and 50 cc. of xylene were refluxed and agitated under a Stark and Dean tube. The temperature was maintained at 260° C. for 3¾ hours, after which the theoretical quantity of water had been collected. The product was stripped to 260° C. at 130μ. A 60% solution in mineral spirits was prepared containing 0.3% Pb and 0.06% Co as naphthenates.

*Example 13*

162 grams of the resin of Example 10, 224 g. of soybean oil fatty acids, 4 g. triphenyl phosphite, and 50 cc. of xylene were refluxed and agitated under a Stark and Dean tube. The temperature was maintained at 260° C. for 5 hours, after which the theoretical quantity of water required for complete esterification of the fatty acids was recovered. The quantity of fatty acids employed was sufficient for esterification of 80% of the hydroxyl groups in the phenolic resin. The product was stripped to 260° C. at 45μ. A 60% solution in mineral spirits was prepared containing 0.3% Pb and 0.06% Co as naphthenates.

*Example 14*

162 grams of the resin of Example 5, 350 g. of soybean acids, 5 g. triphenyl phosphite, and 50 cc. of xylene were refluxed and agitated under a Stark and Dean tube. The temperature was maintained at 260° C. for 4 hours, after which the theoretical quantity of water required for complete esterification was recovered. The product was stripped to 260° C. at 75μ. A 60% solution of the ester in mineral spirits was prepared, the solution containing 0.3% Pb and 0.06% Co as naphthenates.

*Example 15*

162 grams of the resin of Example 7, which resin had been subjected to the second stripping step at a temperature of 310° C. and 3 mm. of mercury, 375 g. of fish oil fatty acids (Neofat 19), 4 g. of triphenyl phosphite, and 50 cc. of xylene were refluxed and agitated under a Stark and Dean tube. The temperature was maintained at 260° C. for 4 hours, after which approximately 99% of the theoretical quantity of water required for complete esterification was recovered. The product was stripped to 260° at 120μ. The product was made into a 60% solution in mineral spirits containing 0.3% Pb and 0.06% Co as naphthenates.

*Example 16*

A para-tertiary-butylphenol formaldehyde resin was prepared in a 50 gallon autoclave using equimolar quantities of para-tertiary-butylphenol and formaldehyde and using oxalic acid as a catalyst in the quantity of 1% by weight based on the weight of the para-tertiary-butylphenol. The reaction was conducted at 160° C. for 5 hours, after which the resin was stripped to 275° C. at 5 mm. The melting point of the resin was 178–200°

C. The viscosity of a 30% solution in dimethyl formamide was 13.40 centistokes.

12 pounds of the above resin, 25 pounds, 15 oz. of soybean oil fatty acids, 109 g. of triphenyl phosphite, and 4 liters of xylene were heated in a kettle to 260° C. for 6 hours. The kettle was provided with a trap for removal of by-product water. The product had an acid number of 334. Thereafter a portion of the ester was stripped by heating to 260° C. at 2 mm. The acid value of the stripped mterial was 4.8.

A portion of the unstripped ester was stirred vigorously for 5 minutes at room temperature with an equal volume of methanol. Three such extractions were made, after which the residual ester had an acid number of 6.9. A 60% solution in mineral spirits was prepared, the solution containing 0.3% Pb and 0.06% Co as naphthenates.

The properties of the films prepared in the preceding examples are tabulated in the following table:

taining approximately 70% rosin acid and approximately 30% fatty acid and the third with a mixture of 50% by weight soybean oil fatty acids and 50% by weight of the above described rosin acid fraction. An excess of 25 mol percent of fatty acids was used in the three esterifications. The viscosity of a bodied sample of the soybean oil acids was 24.65 centistokes. The resin and the esterifying acids were mixed with a small amount of triphenyl phosphite in the presence of xylene and the mixture was refluxed and agitated under a Stark and Dean tube for 6 hours at 260° C. Thereafter, the reaction mixture was stripped to a temperature of about 275° C. at an absolute pressure of approximately 200μ to remove unreacted acids. 30 g. of the stripped product were then dissolved in 30 g. of mineral spirits and 3 cc. of a solution containing 3% lead and 0.6% cobalt as naphthenates were added. The solution was applied to tubes and plates, and the films were allowed to dry. The properties of the esters and of the films produced therefrom

| Example No. | 1 | 2 | 3 | 4 | 5 | 6 | 7 | 8 |
|---|---|---|---|---|---|---|---|---|
| M.P. of Resin, °C | 205–225 | 205–224 | 205–225 | 174–188 | 205–225 | 205–225 | 133–139 | 133.139. |
| Visc. of Resin | 10.82 | 10.82 | 10.82 | 9.58 | 10.75 | 10.75 | 5.98 | 5.98. |
| Acids | Soy | Linseed | Castor | Soy | Castor | Linseed | Soy | Castor. |
| Visc. of Bodied Acids | 26.45 | 43.29 | 70.33 | 26.45 | 70.33 | 43.29 | 26.45 | 70.33. |
| Polymerizability Index | 286.2 | 468.4 | 761.0 | 253.4 | 756.0 | 465.4 | 158.2 | 420.6. |
| Hours of esterification | 4 | 3.67 | 2.25 | 6 | 2.50 | 4 | 6 | 3. |
| Acid # | 4.0 | 5.9 | 11.0 | 2.6 | 9.0 | 5.7 | 5.1 | 8.4. |
| OH # | 29.7 | 11.9 | 13.1 | 13.5 | 27.0 | 51.1 | 26.1 | 12.3. |
| Tack free to foil, hrs | 24 | 6½ | 7 | | 4 | 5½ | 24 | 24. |
| Hardness in 24 hrs | 16 | | | 14 | 18 | 16 | 14 | 24. |
| Hardness in 7 days | 170 days, 26. | 18 | 16 | | 16 | 18 | 18 | 8 days, 28. |
| Failed in 5% NaOH | 72 hrs | 50 days | 18 days | 24 hrs | 63 days | 10 days | 6 hrs | 2 days. |
| Boiling H₂O, 2 hr. immersion | OK | OK | OK | OK | OK | OK | OK | OK. |
| Cold H₂O, 3 day immersion | | OK | OK | Blushed 4 days, recovered. | OK | OK | Blush 3 days | OK 4 days. |

| Example No. | 9 | 10 | 11 | 12 | 13 | 14 | 15 | 16 |
|---|---|---|---|---|---|---|---|---|
| M.P. of Resin, °C | 158–165 | 155–160 | 155–160 | 155–160 | 155–160 | 205–225 | 133–139 | 178–200. |
| Visc. of Resin | 7.17 | 8.83 | 8.83 | 8.83 | 8.83 | 10.75 | 5.98 | 13.40. |
| Acids | Linseed | Soy | Linseed | Castor | Soy | Soy | Fish | Soy. |
| Visc. of Bodied Acids | 43.29 | 26.45 | 43.29 | 70.33 | 26.45 | 26.45 | 90.96 | 26.45. |
| Polymerizability Index | 310.4 | 233.5 | 382.3 | 621.0 | 233.5 | 284.3 | 543.9 | 354.4 |
| Hours of esterification | 5 | 4 | 5 | 3.75 | 5 | 4 | 4 | 6. |
| Acid # | 7.4 | 4.8 | 4.9 | 7.7 | 7.3 | 4.9 | 9.0 | 6.9. |
| OH # | 42.2 | 0 | 0 | 14.3 | 47.2 | 28.4 | 3.4 | 7.1. |
| Tack free to foil, hrs | 6 | 24 | 5 | 24 | 24 | 24 | 6 | 24. |
| Hardness in 24 hrs | 20 | 16 | 22 | 18 | 16 | | 18 | 14. |
| Hardness in 7 days | 34 | 22 | 32 | 26 | 20 | 20 | 36 | |
| Failed in 5% NaOH | 10 days | 24 hrs | 24 hrs | 6 days | 24 hrs | 8 days | 2 days, 1 spot. | 2 days. |
| Boiling H₂O, 2 hr. immersion | Blushed 2 hrs., recovered. | OK | OK | OK | Blushed 2 hrs., recovered. | OK | Blushed 2 hrs., recovered. | OK. |
| Cold H₂O, 3 day immersion | Blushed 3 days, recovered. | OK | OK | OK | Blushed 3 days, recovered. | OK 5 days. | Blushed 3 days, recovered. | OK. |

*Example 17*

The following materials were charged into a one-gallon Monel metal autoclave:

1200 g. of para-tertiary-butylphenol
715 g. of a 37% aqueous solution of formaldehyde
11.2 g. of oxalic acid dihydrate The quantity of formaldehyde was a 10% excess over the amount required for an equivalent ratio of 1:1. The autoclave was sealed and was heated to 160° C. for 3 hours. The autoclave was then cooled and the product removed. The crude resin was stripped to 270° C. at 850μ. The product had a hydroxyl number of 342.7, 354.8 and a melting point of 188–193° C. The viscosity of a 30% solution in dimethyl formamide was 13.62 centistokes.

Three samples of the above resin were esterified, the first with soybean oil fatty acids solely, the second with a mixture of 70% by weight soybean oil fatty acids and 30% by weight of a rosin acid fraction of tall oil con- are indicated in the table appearing at the end of these examples.

*Example 18*

A crude resin was prepared as described in the preceding example except that a 15% excess of formaldehyde was employed. The crude resin was stripped to 270° C. at 300μ. The product had a hydroxyl number of 326 and a melting point of 177–185° C. The viscosity of a 30% solution in dimethyl formamide was 17.73 centistokes.

Three esters were prepared from this resin using the acids and the procedure described in Example 17. The properties of the products are indicated in the table.

*Example 19*

A crude resin was prepared as described in the preceding example, except that 20% excess formaldehyde was employed. The crude resin was stripped to 280° C. at 750μ. The product had a hydroxyl number of 323 and a melting point of 193–6° C. The viscosity of a 30% solution in dimethyl formamide was 20.63 centistokes.

Three esters were prepared from this resin using the acids and the procedure described in Example 17. The properties of the products are indicated in the table.

*Example 20*

A crude resin was prepared as described in the preceding example except that a 25% excess of formaldehyde was employed. The crude resin was stripped at 270° C. at 300μ. The product had a hydroxyl number of 295 and a melting point of 192–8° C. The viscosity of a 30% solution in dimethyl formamide was 27.89 centistokes.

Three esters were prepared from this resin using the acids and the procedure described in Example 17. The properties of the products are indicated in the table.

*Example 21*

An ester was made from a para-tertiary-butylphenol formaldehyde and a mixture of soybean oil fatty acids and rosin. The resin had a viscosity in a 30% dimethyl formamide solution of 9.61 centistokes. 162 g. of the resin, 93 g. of rosin, 263 g. of soybean oil fatty acids, 4 g. of triphenyl phospite and 50 cc. of xylene were refluxed and agitated under a Stark and Dean tube for 6 hours at 260° C. At this time, approximately 90% of the theoretical quantity of water required for complete esterification was obtained. The product was then stripped to 275° C. at 550μ. A solution was prepared as described in Example 17 and had the properties indicated in the table.

*Example 22*

An ester was made from dehydrated castor oil fatty acids and a para-tertiary butyl phenolformaldehyde resin. The resin had a viscosity in a 30% solution in dimethyl formamide of 7.32 centistokes. The dehydrated castor oil fatty acids when bodied had a viscosity of 70.33 centistokes. 162 g. of the resin, 62 g. of water-white gum rosin, 294 g. of dehydrated castor oil fatty acids, 4 g. of triphenyl phosphite and 50 cc. of xylene were refluxed and agitated under a Stark and Dean tube for 4 hours at 260° C. The product was stripped to 265° C. at 50μ. A 30% solution was prepared as described in Example 17. The properties are indicated in the following table.

| Soybean Acids, Percent | Rosin Acid Fraction, Percent | Acid No. | Hydroxyl No. | Tack free to foil, hrs. | Sward Rocker Hardness 1 day | Sward Rocker Hardness 7 days | 5% NaOH |
|---|---|---|---|---|---|---|---|
| Ex. 17: | | | | | | | |
| 100 | 0 | 4.2 | 7.38 | | 20 | 18 | 3 days. |
| 70 | 30 | 6.2 | 11.6 | 4¾ | 24 | 36 | 5 days. |
| 50 | 50 | 7.0 | 8.6 | 4⅔ | 38 | 42 | 7 days. |
| Ex. 18: | | | | | | | |
| 100 | 0 | 5.9 | 18.3 | 4½ | 18 | 22 | 3 days. |
| 70 | 30 | 8.7 | 9.0 | 4½ | 28 | 36 | 11 days. |
| 50 | 50 | 10.4 | 24.5 | 4⅙ | 28 | 38 | 9 days. |
| Ex. 19: | | | | | | | |
| 100 | 0 | 9.2 | 10.6 | 4¾ | 18 | 20 | 24 hrs. |
| 70 | 30 | 10.1 | 18.6 | 3⅔ | 30 | 36 | 24 hrs. |
| 50 | 50 | 12.0 | 13.4 | 3¼ | 38 | 48 | 5 days. |
| Ex. 20: | | | | | | | |
| 100 | 0 | 7.4 | 14.7 | 5¾ | 12 | 18 | |
| 70 | 30 | | | 4¾ | 22 | 36 | 19 days. |
| 50 | 50 | 15.0 | 3.4 | 4 | 40 | 46 | 18 days |
| Ex. 21: | | | | | | | |
| 70 | 30 | 18.0 | 32.4 | 5½ | 18 | 28 | 7 days. |
| Dehydrated Castor Acids | | | | | | | |
| Ex. 22: | | | | | | | |
| 80 | 20 | 8.9 | 21.8 | 5½ | 18 | 24 | 15 days. |

A series of additional examples was prepared as previously described. These products were prepared from the indicated phenol with formaldehyde, the character of the resin and of the esterifying acid being shown in the following table. The percentage figures under the column headed "Esterifying Acid" indicate the extent to which the resin is esterified with the respective acids. In each instance the product was stripped to a low acid number, usually below 10. The results shown in the table indicate that with a variety of resins and a variety of esterifying acids it is possible to obtain compounds related to those shown in the previous tables possessing comparable properties. It will be apparent that numerous other variations may be made within the scope of the present disclosure to obtain similar products.

| Sample | Type Resin | Resin Visc. | Esterifying Acid | Poly. Index | Drying Time (Min.) | Hardness 3 days | Hardness 7 days | 5% NaOH (hrs.) |
|---|---|---|---|---|---|---|---|---|
| 1 | p-t-amyl phenol | 19.5 | Soy 50% | 515.8 | Tack Free (Minutes) 150. | 24 | 37 | OK 336. |
| 2 | do | 5.5 | Dehydrated Castor 80%, Rosin 20%. | 386.8 | 150 | 20 | 30 | Sl. Yellow 168. Sl. haze 336. |
| 3 | p-isopropyl phenol | 14.9 | Soy 50% | 394.1 | 320 | 28 | 26 | OK 336. |
| 4 | o-isopropyl phenol | 11.25 | Linseed 100% | 487.0 | 460 | | | Brown and hazy 96. |
| 5 | o-cresol | 27.5 | Soy 100% | 627.4 | 370 | 18 | 20 | Loose, hazy brown 96. |
| 6 | octyl phenol | 10.5 | Linseed 100% | 454.5 | 300 | 15 | 14 | Sl. hazy 336. |
| 7 | p-t-amyl phenol | 11.9 | do | 515.2 | 370 | 14 | 18 | Sl. hazy and yellow 336. |
| 8 | Mixed xylenols and cresols | 23.4 | Soy 100% | 618.9 | 300 | 20 | 20 | Brown 24. |

I hereby claim as my invention:

1. An ester of a para-tertiary-butylphenol formaldehyde resin, the resin having been prepared from said phenol and formaldehyde as the sole reactants, in the presence of an acid catalyst, said resin being substantially free from monomeric phenol and lower molecular weight condensation products containing two phenolic nuclei, said resin having at least 50% of its hydroxyl groups esterified with acids selected from the group consisting of (1) unsaturated higher fatty acids containg from 8 to 22 carbon atoms and (2) mixtures of said unsaturated higher fatty acids with from 10–40% of rosin acids based on the total weight of the mixture, said ester being characterized by a polymerizability index of 140–1000, said polymerizability index being the mathematical product of (a) the viscosity in centistokes at 30° C. of a 30% solution by weight of the resin in dimethyl formamide and (b) the viscosity in centistokes obtained on a bodied sample of the unsaturated fatty acids, said ester having an acid number below 20.

2. Product according to claim 1 in which the resin employed for esterification is substantially free from material vaporizable at 250° C. at 5 mm. of mercury absolute pressure.

3. Product according to claim 1 in which the resin employed for esterification is substantially free from material vaporizable at 310° C. at 5 mm. of mercury absolute pressure.

4. Product according to claim 1 in which the polymerizability index is between 280 and 600.

5. Product according to claim 1 in which the ester is substantially free from materials vaporizable at 260° C. at 5 mm. of mercury absolute pressure.

6. Product according to claim 1 in which the hydroxyl groups of the resin are substantially completely esterified with the mixed rosin and unsaturated higher fatty acids.

7. Product according to claim 1 in which the resin has a viscosity within the range of 5 to 35 centistokes and in which the unsaturated higher fatty acid has a bodied viscosity within the range of 20 to 100 centistokes.

8. Product according to claim 1 in which the resin has at least 70% of its hydroxyl groups esterified with a mixture of rosin acid and unsaturated higher fatty acids.

References Cited in the file of this patent
UNITED STATES PATENTS

| | | |
|---|---|---|
| 2,091,965 | Cherry | Sept. 7, 1937 |
| 2,124,285 | Bucherer | July 19, 1938 |
| 2,622,071 | Harrison | Dec. 16, 1952 |
| 2,638,458 | Wheeler | May 12, 1953 |
| 2,649,422 | Aelony | Aug. 18, 1953 |
| 2,676,158 | Renfrew | Apr. 20, 1954 |
| 2,730,511 | Floyd | Jan. 10, 1956 |